US012397575B1

(12) United States Patent
Sun

(10) Patent No.: US 12,397,575 B1
(45) Date of Patent: Aug. 26, 2025

(54) POP UP GREETING CARD

(71) Applicant: Shiyu Sun, Shenzhen (CN)

(72) Inventor: Shiyu Sun, Shenzhen (CN)

( * ) Notice: Subject to any disclaimer, the term of this patent is extended or adjusted under 35 U.S.C. 154(b) by 0 days.

(21) Appl. No.: 18/941,920

(22) Filed: Nov. 8, 2024

(30) Foreign Application Priority Data

Sep. 20, 2024 (CN) ......................... 202422299440.3

(51) Int. Cl.
*B42D 15/04* (2006.01)
*B42D 15/02* (2006.01)

(52) U.S. Cl.
CPC ......... *B42D 15/045* (2013.01); *B42D 15/022* (2013.01)

(58) Field of Classification Search
CPC ............................ B42D 15/045; B42D 15/022
See application file for complete search history.

(56) References Cited

U.S. PATENT DOCUMENTS 1,499,891 A * 7/1924 Storer ....................... G09F 1/06 446/147
2,113,238 A * 4/1938 Ouwerkerk ............... G09F 1/08 40/539
8,887,420 B2 * 11/2014 Nelson ................. B42D 15/027 40/124.03
10,500,887 B1 * 12/2019 Kelly ................... B42D 15/045
2013/0305573 A1 * 11/2013 Nemeth ............... B42D 15/022 40/124.02
2016/0068003 A1 * 3/2016 Bogdanski ........... B42D 15/022 40/124.03
2018/0370272 A1 * 12/2018 Adair ................... B42D 15/045
2019/0070886 A1 * 3/2019 Nelson ................... B65D 77/20
2024/0066418 A1 * 2/2024 Joyce ....................... A63H 3/10

* cited by examiner

*Primary Examiner* — David R Dunn
*Assistant Examiner* — Christopher E Veraa
(74) *Attorney, Agent, or Firm* — Daniel M. Cohn; Howard M. Cohn

(57) ABSTRACT

The invention discloses a POP UP greeting card, which comprises a background wallboard, a folding movable plate, a panel frame body and a stage display plate, characterized in that said the background wallboard is a basic bottom piece, the folding movable plate is bonded with the central part of the background wallboard, the left end and the right end of the folding movable plate respectively penetrate through the panel frame body to form a stage-shaped three-dimensional shape, and the stage display plate is fixed in the stage-shaped three-dimensional shape. The present invention provides a POP UP greeting card which is simple in structure, high in reliability, convenient to produce and open, and capable of automatically three-dimensional display, and further adds an acousto-optic effect and an automatically three-dimensional display with acousto-optic effects to meet market requirements.

10 Claims, 10 Drawing Sheets

POP UP GREETING CARD

TECHNICAL FIELD

The invention relates to a stereo greeting card with acousto-optic stage modeling, in particular to a stereo greeting card with acousto-optic stage modeling.

BACKGROUND ART

The greeting card, which is a unique gift, can bear the emotion of the owner of the cardholder, and the festival, whether birthday, commemorative day, festival or other special occasions, and can convey the center of the cardholder to the consignee, so that the other party can feel the care and warm.

Greeting cards are developed from traditional planar board chips to a wide variety of stereo-effect greeting cards to meet more demands of people. However, in order to perform deep analysis on existing stereo greeting cards, it is found that there are many disadvantages.

In the existing stereo greeting card, although a product with an acousto-optic effect is also added, the acousto-optic effect can be triggered only by touching the button by a person, so that the best effect can be immediately displayed when the stereo greeting card cannot be opened, and the feeling of the greeting card is insufficient, thereby reducing the effect of the greeting card.

Therefore, the present invention aims to provide a stereoscopic greeting card which is simple in structure, high in reliability and convenient to produce and open, and can automatically display acousto-optic effects to meet market requirements.

SUMMARY OF THE INVENTION

An object of the present invention is to provide a stereoscopic greeting card to solve the technical deficiencies proposed in the background art.

In order to achieve the above object, the present invention provides a POP UP greeting card, comprising a background wallboard, a foldable movable plate, a panel frame and a stage display panel, wherein the background wallboard is a base substrate having a planar main body with a defined central region and left/right edge regions, the foldable movable plate is bonded to the central part of the background wallboard, the left and right ends of the foldable movable plate respectively pass through the panel frame to form a stage-shaped three-dimensional model, and the stage display panel is fixed therein.

Further, an acousto-optic circuit board is arranged in the background wallboard, a trigger switch is automatically triggered when the greeting card is unfolded, and the acousto-optic circuit board emits an acousto-optic effect.

Further, the trigger switch is a magnetically controlled switch, and the triggered magnet sheet is disposed in the foldable movable plate.

Further, the trigger switch is a photoresistor sensor, and the photoresistor sensor is disposed on a central portion of the background wallboard.

Further, the trigger switch is a mechanical switch, and the mechanical switch is disposed between the foldable movable plate and the background wallboard.

Further, the background wallboard is of a double-layer paperboard structure, and an acousto-optic circuit board is built in the background wallboard.

Further, the foldable movable plate is provided with four folding lines in the vertical direction, the plate is divided into a first left plate, a second left plate, a central plate, a first right plate and a second right plate, the central plate is centered and symmetrical left and right, the central plate is bonded and fixed to the background wallboard, the first left plate passes through the left side of the panel frame, the first right plate passes through the right side of the panel frame, the first left plate and the first right plate are fitted with the panel frame, and the first left plate and the first right plate can be pulled to move relative to each other.

Further, the left and right ends of the foldable movable plate are each provided with a handle position.

Further, the panel frame body is a rectangular plate folded along upper and lower edges, adhered at the folded edges, with a central cutout to form an opening, and semicircular cutouts at left and right ends to expose handle positions.

Further, the stage display panel is a plurality of folding plate pieces, and the folding plate pieces arranged on the second left plate piece and the second right plate piece are parallel to the background wallboard.

Compared with the prior art, the present invention has the beneficial effects of providing a POP UP greeting card which is simple in structure, high in reliability, convenient to produce and open, and capable of automatically displaying acousto-optic effects, thereby meeting market requirements.

REFERENCE NUMERALS IN THE DRAWINGS

Figure 1:
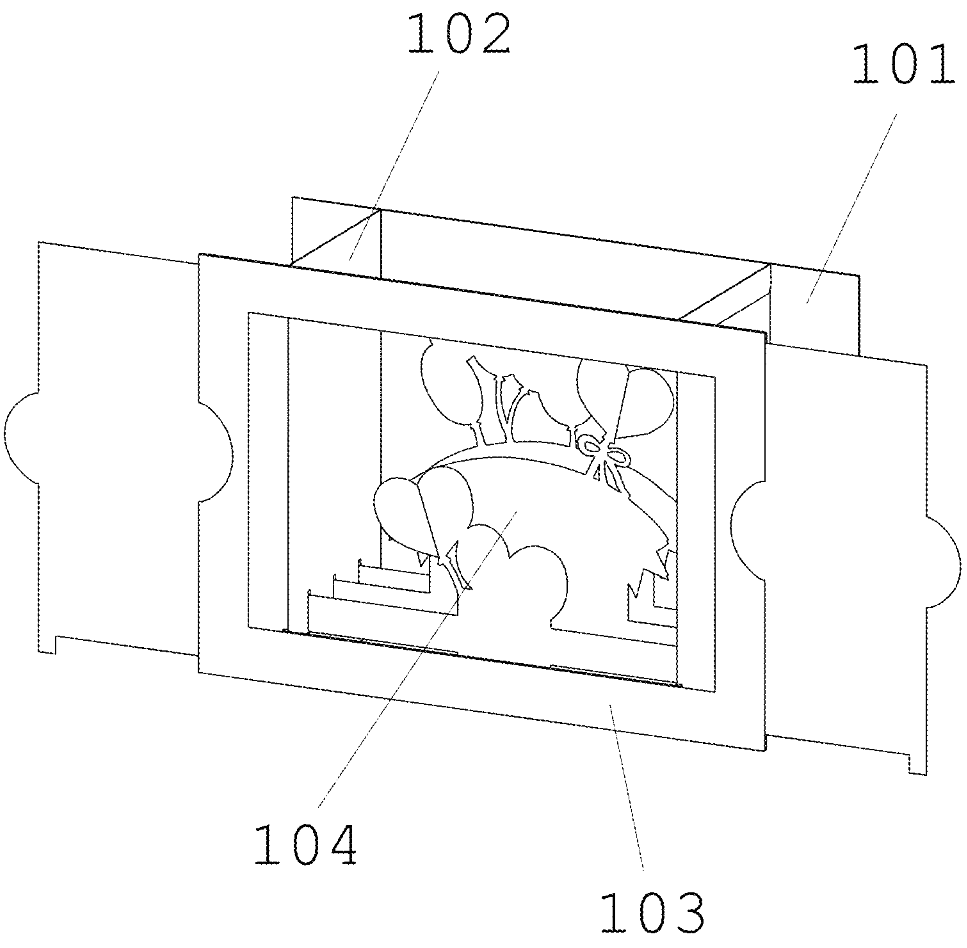
FIG. 1 is a schematic perspective view of a stereoscopic greeting card according to an embodiment.
Figure 2:
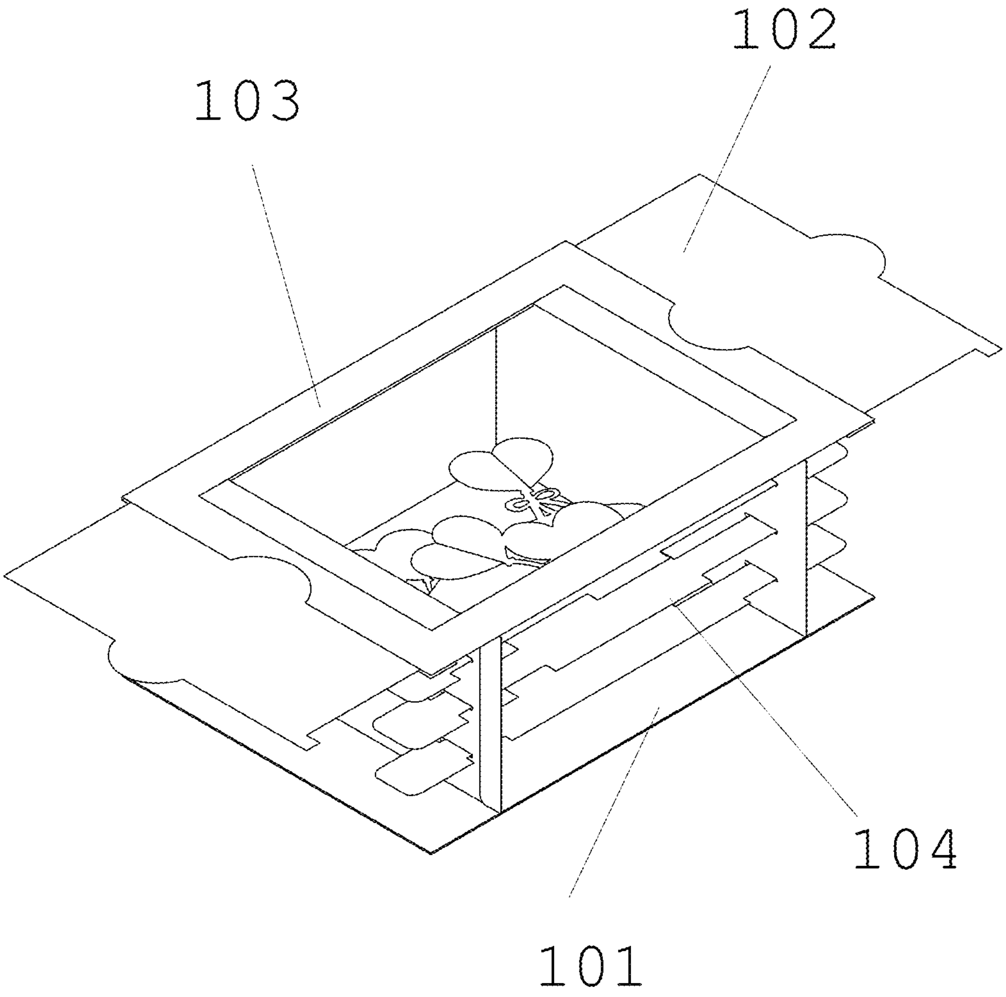
FIG. 2 is a second perspective view of a stereoscopic greeting card according to an embodiment.
Figure 3:
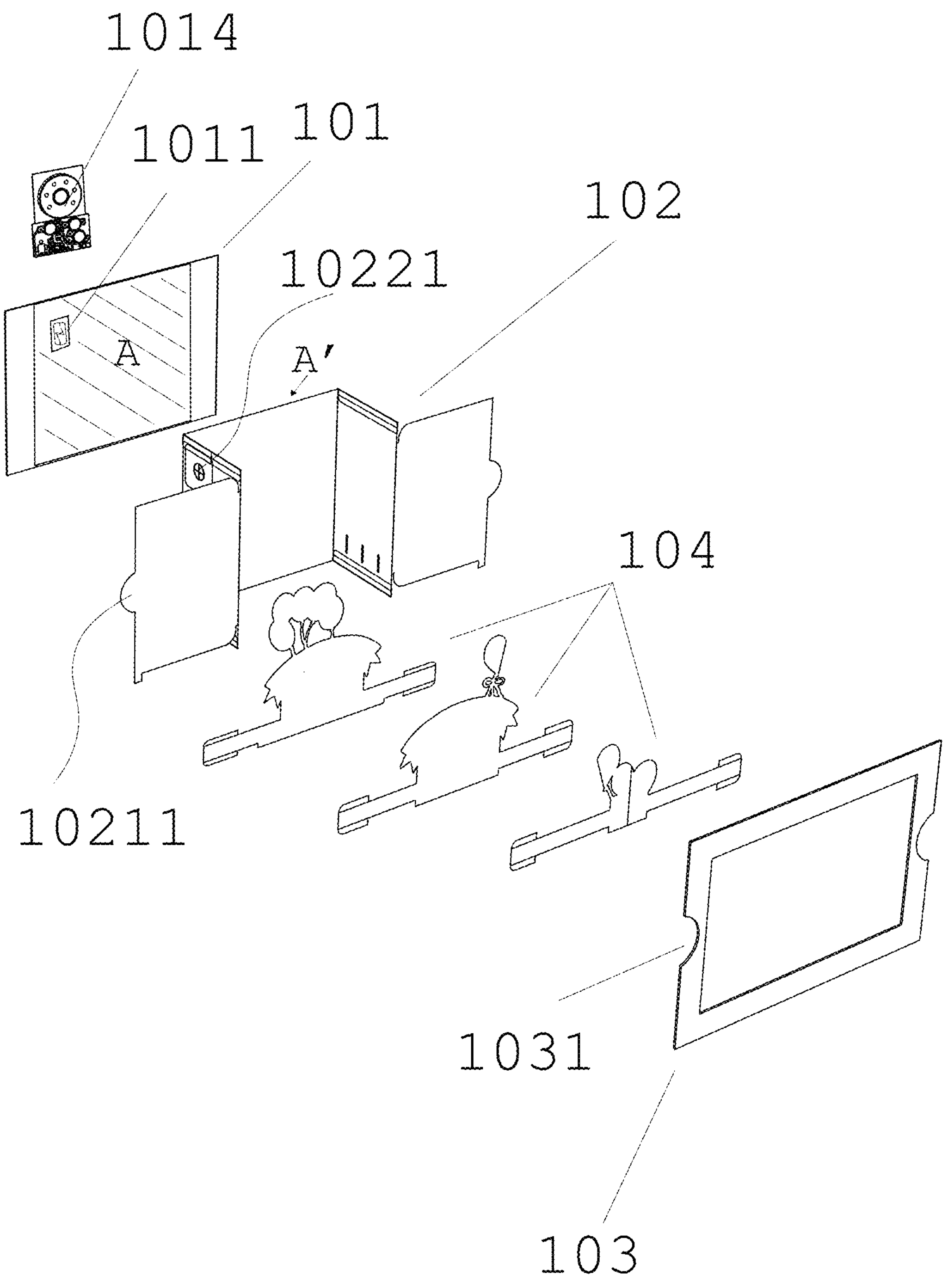
FIG. 3 is an exploded schematic diagram of a stereoscopic greeting card according to an embodiment.
Figure 4:
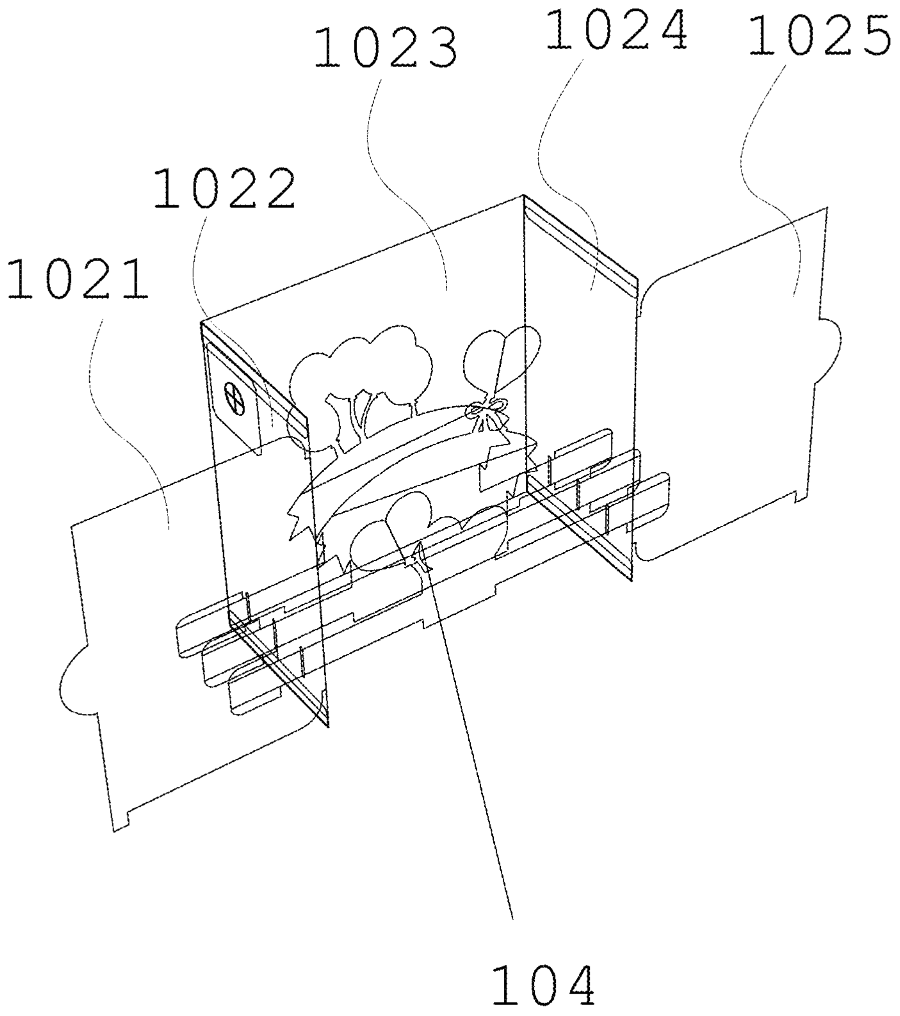
FIG. 4 is a schematic structural diagram of a combined structure of a foldable movable plate and a stage display plate according to an embodiment.
Figure 5:
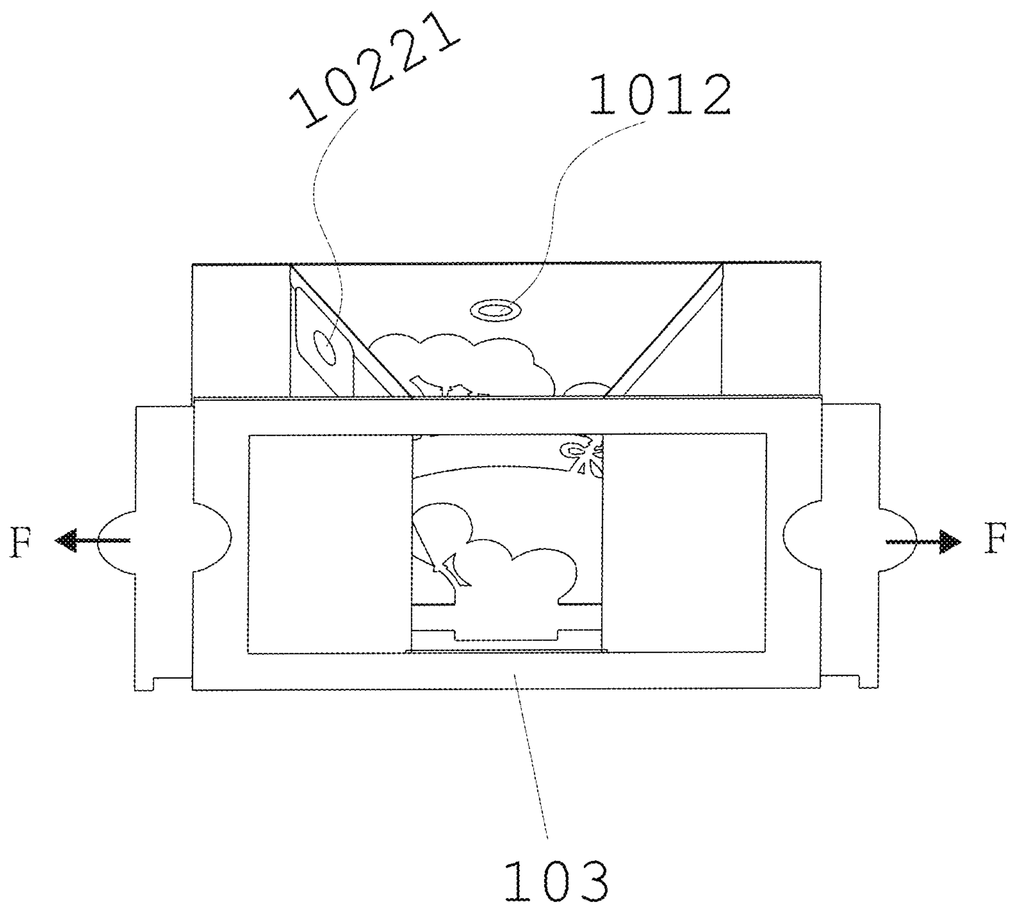
FIG. 5 is a schematic diagram of a state structure in an expansion process of a stereoscopic greeting card according to an embodiment.
Figure 6:
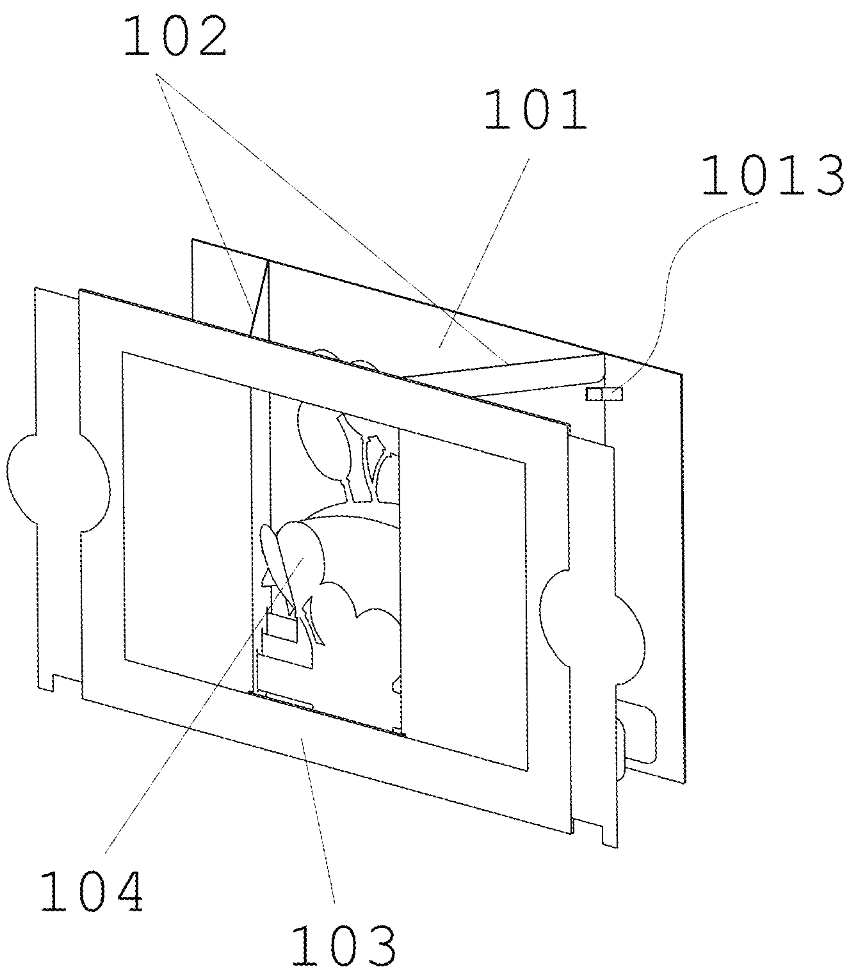
FIG. 6 is a schematic diagram of a state structure in another unfolding process of a stereoscopic greeting card according to an embodiment.
Figure 7:
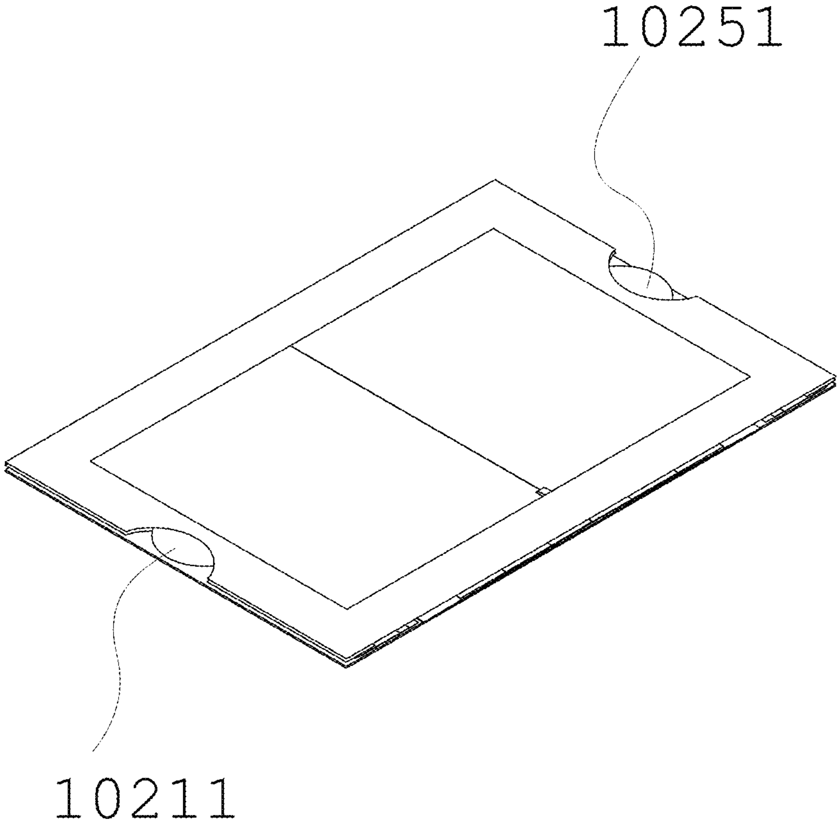
FIG. 7 is a schematic structural diagram of a folded state of a stereoscopic greeting card according to an embodiment.

101—background wallboard piece,
102—folding movable plate piece,
103—panel frame body,
104—stage display plate piece,
1011—magnetic control switch,
1012—photoresistor sensor,
1013—mechanical switch
1014—acousto-optic circuit board
1021—first left plate piece,
1022—second left plate piece,
1023—center plate piece,
1024—first right plate piece,

1025—second right plate piece,
10211—left handle position,
10221—magnet piece,
10251—right handle position.

DETAILED DESCRIPTION OF PREFERRED EMBODIMENTS

The technical solution of this patent is further described in detail below with reference to specific embodiments.

As shown in FIG. 1, FIG. 2, FIG. 3, FIG. 4, FIG. 5, FIG. 6, or FIG. 7, the POP UP greeting card includes a background panel 101, a foldable movable plate 102, a panel frame 103, and a stage display panel 104.

An acousto-optic circuit board 1014 is arranged in the background wallboard 101, the acousto-optic circuit board is provided with a magnetic control switch 1011, and when the greeting card is opened, the magnet sheet 10221 arranged in the folding movable plate 102 is away from the magnetic control switch 1011, the switch is triggered, and the acousto-optic circuit board emits an acousto-optic effect.

As a preferred embodiment, the trigger switch may be changed to a photoresistor sensor 1012, and the photoresistor sensor 1012 is disposed on a central portion of the background wallboard 101. When the greeting card is opened or folded, the switch is triggered due to the change of the light line of the photosensitive surface of the photoresistor, and the acousto-optic circuit board emits an acousto-optic effect.

As a preferred embodiment, the trigger switch may be changed to a mechanical switch 1013, and the mechanical switch 1013 is disposed between the foldable movable plate 102 and the background wallboard 101. When the greeting card is opened or folded, the folding movable plate 102 moves to trigger the mechanical switch 1013, and the acousto-optic circuit board emits an acousto-optic effect.

The background wallboard 101 is of a double-layer paperboard structure, in which the acousto-optic circuit board is built in, and the surface of the paperboard can be decorated by printed patterns or characters.

The folding movable plate 102 is a plate with four folding lines in the vertical direction, the plate is divided into a first left plate 1021, a second left plate 1022, a central plate 1023, a first right plate 1024 and a second right plate 1025, the center plate 1023 is used as the center, the first left plate 1021 passes through the left side of the panel frame 103, the first right plate 1024 passes through the right side of the panel frame 103, the first left plate 1021 and the first right plate 1025 are fitted with the panel frame 103, and the first left plate 1021 and the first right plate 1025 can be pulled to move relative to each other.

The left and right ends of the foldable movable plate are each provided with a handle bit 10211.

The panel frame 103 is a rectangular plate which is folded up and down, and then is bonded to the upper and lower edges, the center is cut and left, and the left end and the right end also cut off the semicircular 1031 to form a frame body.

Figure 8A:
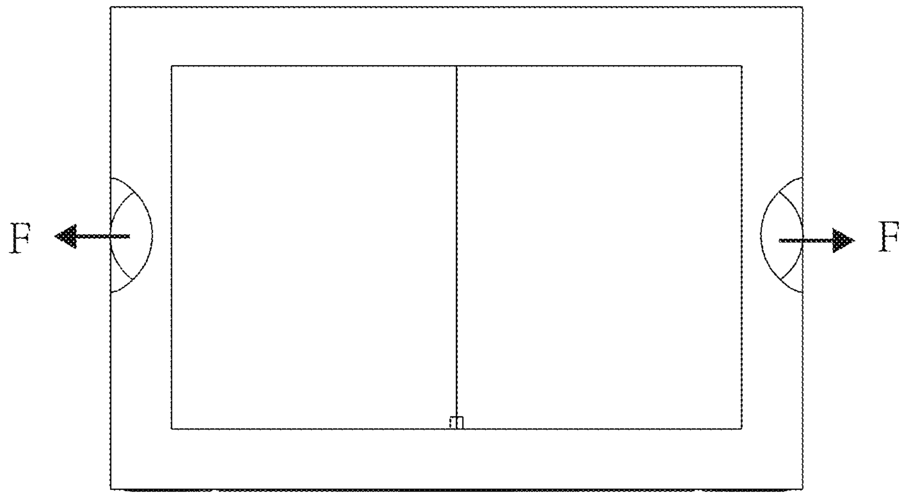
FIG. 8A is a front view of a folded state of a stereoscopic greeting card according to an embodiment.
Figure 8B:
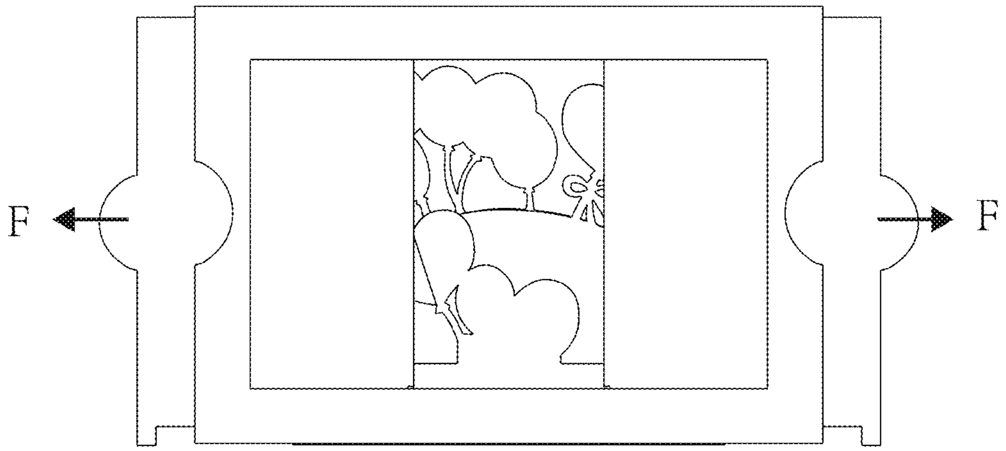
FIG. 8B is a front view of a state of a POP UP greeting card unfolding process according to an embodiment.
Figure 8C:
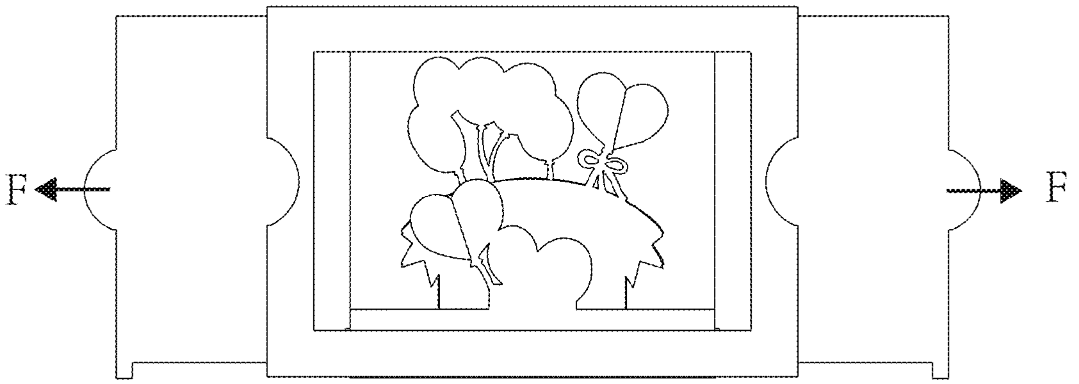
FIG. 8C is a front view of an unfolded state of a stereoscopic greeting card according to an embodiment.

The stage display panel 104 is a plurality of molding plates, and the hole positions, the hole positions, and the molding plates disposed on the second left plate and the second right plate are parallel to the background wall plate. In use, as shown in FIG. 8A, FIG. 8B and FIG. 8C, FIG. 8A is a schematic diagram of a greeting card in a folded flattening state, a product volume becomes a minimum state, and it is convenient to store an envelope and transport; the handle position 10211 is pulled, the two sides are pulled, the greeting card can be unfolded, light and music are turned on at the same time, and FIG. 8B is a schematic diagram of the state of the greeting card in the unfolding process; FIG. 8C is a schematic diagram of a fully opened state, like a stage, and a plurality of modeling plates such as balloons, fresh flowers, cakes and the like are arranged in the center.

It will be apparent to those skilled in the art that the present invention is not limited to the details of the exemplary embodiments described above, and that the present invention can be embodied in other specific forms without departing from the spirit or essential characteristics of the invention. Therefore, regardless of which point the embodiments should be considered as exemplary and not restrictive, the scope of the invention is defined by the appended claims rather than by the foregoing description, and therefore, it is intended that all changes that come within the meaning and range of equivalency of the claims are to be embraced within their scope. Any reference signs in the claims should not be regarded as limiting the involved claims.

In addition, it should be understood that although the description is described in terms of implementations, but not every implementation includes only one independent technical solution, such description of the specification is merely for clarity, a person skilled in the art should use the description as a whole, and the technical solutions in the embodiments may also be appropriately combined to form other implementations that can be understood 180 by a person skilled in the art.

What is claimed is:

1. A POP UP greeting card, comprising a background wallboard (101), a foldable movable plate (102), a panel frame (103), and a stage display panel (104), characterized in that said the background wallboard (101) is a base substrate having a planar main body with a defined central region and left/right edge regions; the foldable movable plate (102) is bonded to the central part of the background wallboard (101); the left or right ends of the foldable movable plate (102) respectively pass through the panel frame (103) to form a stage-shaped three-dimensional model; and the stage display panel (104) is fixed therein.

2. The POP UP greeting card according to claim 1, wherein an acousto-optic circuit board (1014) is arranged in the background wallboard (101), a trigger switch is automatically triggered when the greeting card is unfolded, and the acousto-optic circuit board emits an acousto-optic effect.

3. The POP UP greeting card according to claim 2, wherein the trigger switch is a magnetically controlled switch (1011), and a triggered magnet sheet is disposed in the foldable movable plate.

4. The POP UP greeting card according to claim 2, wherein the trigger switch is a photoresistor sensor (1012), and the photoresistor sensor (1012) is placed in the background wallboard.

5. The POP UP greeting card according to claim 2, wherein the trigger switch is a mechanical switch (1013), and the mechanical switch (1013) is disposed between the foldable movable plate (102) and the background wallboard (101).

6. The POP UP greeting card according to claim 1, wherein the background wallboard (101) is a double-layer paperboard structure, and an acousto-optic circuit board is built in the background wallboard.

7. The POP UP greeting card according to claim 1, wherein the folding movable plate (102) is a plate with four folding lines in the vertical direction, the plate is divided into a first left plate (1021), a second left plate (1022), a central plate (1023), a first right plate (1024) and a second right plate (1025), the center plate (1023) is used as the center, the first left plate (1021) passes through the left side of the panel frame (103), the first right plate (1022) passes through the right side of the panel frame (103), and the first left plate (1021) and the first right plate (1025) are fitted with the panel frame (103) to pull each other.

8. The POP UP greeting card according to claim 7, wherein the left or right ends of the foldable movable plate (102) are each provided with a handle position.

9. The POP UP greeting card according to claim 1, wherein the panel frame body (103) is a rectangular plate folded along upper and lower edges, adhered at the folded edges, with a central cutout to form an opening, and semicircular cutouts at left and right ends to expose handle positions (10211, 10251).

10. The POP UP greeting card according to claim 7, wherein the stage display panel (104) is a plurality of folding plates, and the folding plate that traverse the second left plate (1022) and the second right plate (1024) are both parallel to the background wallboard (101).

* * * * *